United States Patent

[11] 3,622,347

| [72] | Inventors | Otto T. Aepli |
| | | Southgate; |
| | | Ray W. Schultz, Wyandotte, both of Mich. |
| [21] | Appl. No. | 802,260 |
| [22] | Filed | Feb. 25, 1969 |
| [45] | Patented | Nov. 23, 1971 |
| [73] | Assignee | BASF Wyandotte Corporation |
| | | Wyandotte, Mich. |

[54] TREATMENT OF SHRIMP TO REMOVE NONEDIBLE PARTS
5 Claims, No Drawings

| [52] | U.S. Cl. | 99/111 |
| [51] | Int. Cl. | A22c 29/00 |
| [50] | Field of Search | 99/111, 160, 188, 195 |

[56] References Cited
UNITED STATES PATENTS

| 2,488,184 | 11/1949 | Garnatz et al. | 99/111 |

FOREIGN PATENTS

| 365,558 | 1/1932 | Great Britain | 99/160 |

*Primary Examiner*—Raymond N. Jones
*Assistant Examiner*—Robert M. Elliott
*Attorneys*—Charles G. Lamb, Cedric H. Kuhn, Robert E. Dunn, Bernhard R. Swick and Joseph D. Michaels ABSTRACT: Nonedible parts of shrimp are removed by immersing shrimp in an aqueous solution containing hypochlorite ions or caustic soda.

TREATMENT OF SHRIMP TO REMOVE NONEDIBLE PARTS

This invention relates to a process and product for removing the nonedible parts, such as eggs, shells, heads, and tails from shrimp. More specifically, this invention relates to a process for removing said nonedible parts from shrimp by chemical action.

In the shrimp-processing industry, processors are confronted with the problem of egg and shell removal from shrimp. They are further confronted with the problem of removing heads and tails from shrimp. Female shrimp carry their eggs on their abdominal legs during the autumn and winter months, hatching these eggs in the spring. It is the autumn and winter months which are the harvesting time for shrimp and all female shrimp harvested during this period still have eggs attached to their body. Removal of these eggs are necessary in order to market these shrimp in the United States since U.S. consumers will not purchase the shrimp with the eggs attached. Further, shrimp processors process shrimp both with and without their shell. Whenever shrimps are processed for marketing without their shell, the processors are confronted with the problem of peeling or removing the shell. In conjunction with the removal of the shells, shrimp processors also remove the heads and the tails.

Presently, shrimp processors utilize mechanical means for removal of these nonedible parts from shrimp. Many problems have arisen in utilizing mechanical means for removal of the nonedible parts. These problems arise from the fact that (1) shrimp vary in size depending upon their species and the geographical area where they are harvested, (2) cost of mechanical means is high in comparison to the product yield, and (3) rate of production is limited to the production rate of the mechanical means.

It is an object of this invention to provide a method for removing the nonedible parts of shrimp. It is another object of this invention to provide a process for removing the nonedible parts of shrimp that will substantially reduce the losses of edible shrimp. It is still another object of this invention to provide higher quality edible shrimp. It is a further object of this invention to provide a process for removing nonedible parts of shrimp by chemical means. Other objects and advantages of this invention will become apparent to those skilled in the art upon consideration of the accompanying disclosure.

The present invention resides in the discovery that an aqueous solution containing hypochlorite ions or sodium hydroxide on contacting the fiber between the nonedible and the edible parts of shrimp breaks down the fiber, thereby enhancing the removal of these nonedible parts. Three variables in the removal process, namely, period of immersion of shrimp in the solution, concentration of the hypochlorite ions or sodium hydroxide in the solution, and solution temperature, can be varied to any set of conditions in a particular operation. For example, high concentrations of active ingredients break down rapidly the fibers holding the nonedible parts to the body of the shrimp. However, this high-active concentrate also attacks the outer layers of the edible part of the shrimp, thereby decreasing the quality and the yield. The result is the same with increased temperature. Low concentration and low temperature increase the time for sufficiently breaking down the aforementioned fiber, but the resulting product is of better quality, higher yield, and requires less washing time to rid the edible product of active ingredients. It has also been found that the addition of fatty acids of sodium hydroxide solutions enhances the removal of nonedible parts of shrimp.

The compositions within the scope of this invention, for breaking down the fibers holding the nonedible parts to the edible parts of the shrimp and thereby enhancing removal of said parts, comprises an aqueous solution containing from about 1 to 10 percent by weight of a hypochlorite ion containing compound or from about 1 to 15 percent by weight of sodium hydroxide, water making up the balance of the solution. In a preferred embodiment, from about 0.1 to about 1.0 percent by weight of fatty acids defined by the formula $C_nH_{2n}O$ is included in the solution containing sodium hydroxide. The solution may also include small amounts of wetting agents and/or defoaming agents.

The hypochlorite ion containing compounds that may be used within the scope of this invention include alkali metal hypochlorites, such as, for example, sodium, potassium, lithium, and calcium hypochlorites, chlorinated triazines, such as, for example, potassium and sodium dichloro-S-triazine trione, 1,3,5-trichloro-2,4,6-trioxyhexahydro-S-triazine, [mono(trichloro)-tetra-(monopotassiumdichloro)]-penta-S-triazine trione, and chlorinated hydantoins, such as, for example, 1,3-dichloro 5,5-dimethylhydantoin, and the like.

The fatty acids that may be used within the scope of this invention, have the general formula $C_nH_{2n}O_2$ wherein $n$ is from 5 to 10 and even higher. These acids include, for example, capric, pelargonic (also commonly called nonylic acid), caprylic, enanthic (also commonly called heptylic acid), caproic, valeric, 2-ethyl heptanoic acids and the isomers thereof and the like.

If desired, a small quantity of any suitable wetting agent and/or defoamer may be added to the treating solution. Compounds suitable for use as wetting agents of defoamers include nonionic surfactants such as a polyoxyethylene-polyoxypropylene block polymer. These surfactants are described in detail in U.S. Pat. No. 2,674,619. Other suitable wetting agents or defoamers are the alkyl aryl polyethers as disclosed in U.S. Pat. No. 2,913,416. Polyethoxylated alcohols as well as amine polyglycol condensates are examples of still other nonionic surfactants that can be employed. The silicone defoamers may also be used as additives to the treating solution. However, the silicone defoamers are added to the treating solution only if excess foaming occurs. The amount of nonionic surfactant actually added is that which is sufficient to give the desired wetting and/or defoaming action. It is generally in the range of 5 to 20 weight percent based on the total additives or in the range of 0.01 to 0.04 weight percent based on total solution.

According to the present invention, raw or cooked shrimp are treated by immersing the shrimp in an aqueous solution containing hypochlorite ions or sodium hydroxide under conditions of concentration, time, agitation, and temperature sufficient to partially disintegrate fiber between the nonedible and edible parts of the shrimp without any substantial damage to the edible parts of the shrimp; removing the shrimp from contact with the solution; and washing the shrimp to provide peeled edible shrimp products.

The concentration of the active ingredients, e.g., sodium hydroxide or hypochlorite ions, in the solution may be varied over a wide range. For example, the concentrate of the active ingredient may be as low as about 1 weight percent or as high as about 15 weight percent for sodium hydroxide and from about 1 weight percent to about 10 weight percent of hypochlorite ion, based on the total solution. When a fatty acid is used in combination with sodium hydroxide, the concentration of the fatty acids may be varied from about 0.1 weight percent to about 1 weight percent, based on the total solution.

The temperature employed in the process of this invention can be varied over a relatively wide range. Usually, the temperature ranges from about 75° F. to about 160° F. The time of immersion of the shrimp products can also be varied over a wide range. For an egg removal process, the immersion should be in the range of from about 2 to 5 minutes. However, when the process is for peeling of shells or shells, heads, and tails of the shrimp, the period of immersion depends upon the condition of the shrimp. For example, if the shrimp are fresh and have only been out of the water for a few minutes, the shell is extremely soft and may be removed in as short a time as 5 minutes. If the shrimp have been out of the water and stored for an extended period such as 1 to 6 months, an immersion period of as long as 1 hour may be required. Also, if the shrimp have been cooked prior to peeling, the shell is again tougher than raw shrimp and will require longer immersion times. However, for most situations the preferred immersion period ranges from about 3 to about 10 minutes.

EXAMPLE I

The following example demonstrates the procedure that was followed in removing shrimp shells, tails, and heads by the process of the present invention.

An aqueous solution was prepared by adding 5 parts by weight of flake sodium hydroxide to 94.5 parts by weight of water. The solution was agitated for about 2 minutes and 0.5 part by weight of a mixture of fatty acids [1] was added. With continued agitation, the temperature of the solution was increased from ambient temperature to 120° F. To this solution was added 1 pound of pink shrimp (Pandalus borealis). Vigorous agitation was applied and the temperature was maintained at 120° F. for about 5 minutes. At the end of this period, it was found that the shells, tails, and heads had become dislodged from the meat.

[1] Fatty acids—a mixture of acids consisting of 24 percent pelargonic, 11 percent caprylic, 38 percent caproic, and 3 percent valeric acids.

EXAMPLE II

The following example demonstrates the procedure that was followed in removing eggs, shells, heads, and tails from shrimp by the process of the present invention.

An aqueous solution was prepared by adding 10 parts by weight of flake sodium hydroxide to 90 parts by weight of water. The solution was agitated for about 2 minutes then brought to a temperature of 150° F. To this solution was added 1 pound of pink shrimp (Pandalus borealis). Vigorous agitation was applied while maintaining the temperature at 150° F. after 3 minutes all of the eggs had been detached from the abdominal leg of the shrimp. Within an additional 2 minutes, the shells, tails, and heads had become dislodged from the meat.

EXAMPLES III–V

The following examples demonstrate the procedure that was followed in removing eggs from shrimp by the process of the present invention.

The egg removal solutions were prepared by adding 10 parts by weight of three different hypochlorite ion containing compound to 90 parts by weight of water. Each solution was agitated for about 2 minutes then brought to a temperature of 75° F. To each solution was added 1 pound of pink shrimp (Pandalus borealis). Vigorous agitation was applied while maintaining the temperature at 75° F. for about 10 minutes. At the end of this period, the shrimp was removed from the solution and rinsed with cold water. The results of the tests for the three hypochorite ion containing solutions are listed in table 1 below.

TABLE 1

| Example No. | Active Ingredients | Results |
|---|---|---|
| III | Sodium hypochlorite | Eggs were completely removed. |
| IV | Ingredient A[2] | Greater than 90% of the eggs were removed. |
| V | Ingredient B[3] | Greater than 90% of the eggs were removed. |

[2] Ingredient A—A commercially available product for the food industry containing soda ash, sodium tripolyphosphate, sodium metasilicate, caustic soda, and [mono(trichloro)-tetra-(monopotassiumdichloro)]-penta-S-triazine trione. Caustic soda was 20 percent by weight of the mixture. Chlorine was 1.9 percent by weight of the mixture.

[3] Ingredient B—A commercially available product for the food industry containing soda ash, sodium metasilicate, sodium tripolyphosphate, and dichloromethylhydantoin. Chlorine was 4 percent by weight of the mixture.

What is claimed is:

1. A process for removing nonedible parts of shrimp comprising contacting said shrimp with a solution containing at least 1 percent by weight of sodium hydroxide or at least 1 percent by weight of hypochlorite ion, based on the total solution, for a period of about 2 minutes to about 1 hour and wherein the solution is maintained at a temperature of about 75° to 160° F., whereby the fiber between the edible parts and the nonedible parts is broken down, thereby enhancing the removal of the nonedible parts of the shrimp from the meat of the shrimp, removing the meat of the shrimp from contact with said solution and then washing the meat to provide an edible product.

2. The process of claim 1 wherein said solution contains from about 0.1 percent by weight of a fatty acid selected from the group consisting of pelargonic acid, caprylic acid, caproic acid, enanthic acid, and mixtures thereof.

3. The process of claim 1 wherein said solution contains a small amount of a defoaming agent.

4. The process of claim 3 wherein said defoaming agent is a nonionic polyoxyethylene-polyoxypropylene block polymer surfactant polyol.

5. The process of claim 1 which further includes vigorously agitating the solution while contacting the shrimp therewith, thereby dislodging the nonedible parts of the shrimp from the meat.

* * * * *

PO-1050
(5/69)

UNITED STATES PATENT OFFICE
CERTIFICATE OF CORRECTION

Patent No. 3,622,347　　　　　　　Dated　November 23, 1971

Inventor(s)　Otto T. Aepli and Ray W. Schultz

It is certified that error appears in the above-identified patent and that said Letters Patent are hereby corrected as shown below:

At column 4, line 46 after enanthic acid should be inserted --valeric acid--.

Signed and sealed this 9th day of May 1972.

(SEAL)
Attest:

EDWARD M. FLETCHER, JR.　　　　ROBERT GOTTSCHALK
Attesting Officer　　　　　　　Commissioner of Patents